(12) United States Patent
Angelskaar et al.

(10) Patent No.: US 7,662,230 B2
(45) Date of Patent: Feb. 16, 2010

(54) LIQUID ACCELERATOR

(75) Inventors: Terje Angelskaar, Zurich (CH); Raita Iwata, Chigasaki (JP)

(73) Assignee: Construction Research & Technology GmbH, Trostberg (DE)

( * ) Notice: Subject to any disclaimer, the term of this patent is extended or adjusted under 35 U.S.C. 154(b) by 535 days.

(21) Appl. No.: 10/571,728

(22) PCT Filed: Aug. 18, 2004

(86) PCT No.: PCT/EP2004/009253

§ 371 (c)(1),
(2), (4) Date: Nov. 8, 2006

(87) PCT Pub. No.: WO2005/028398

PCT Pub. Date: Mar. 31, 2005

(65) Prior Publication Data

US 2007/0044686 A1    Mar. 1, 2007

(30) Foreign Application Priority Data

Sep. 19, 2003    (JP) .............................. 2003-328772

(51) Int. Cl.
*C04B 22/12* (2006.01)
(52) U.S. Cl. ...................................... 106/819
(58) Field of Classification Search .................. 106/819
See application file for complete search history.

(56) References Cited

U.S. PATENT DOCUMENTS

| | | | |
|---|---|---|---|
| 4,507,154 A | 3/1985 | Burge et al. | |
| 4,559,243 A | 12/1985 | Passier et al. | |
| 5,911,819 A | 6/1999 | Franz et al. | |
| 5,935,318 A | 8/1999 | Angelskaar et al. | |
| 5,997,630 A | 12/1999 | Angelskar et al. | |
| 6,302,954 B1 | 10/2001 | Lunkenheimer et al. | |
| 6,537,367 B2 * | 3/2003 | Sommer et al. | 106/724 |
| 6,540,826 B2 * | 4/2003 | Sommer et al. | 106/724 |
| 6,692,564 B2 | 2/2004 | Hofmann | |
| 6,723,163 B1 | 4/2004 | Hofmann | |
| 7,182,808 B2 * | 2/2007 | Angelskaar et al. | 106/823 |

(Continued)

FOREIGN PATENT DOCUMENTS

EP        0 465 991 A1    1/1992

(Continued)

OTHER PUBLICATIONS

JP 2004035387 A (Angelskaar et al.) Feb. 5, 2004. abstract only.*

(Continued)

*Primary Examiner*—Paul Marcantoni
(74) *Attorney, Agent, or Firm*—Curatolo Sidoti Co., LPA; Joseph G. Curatolo; Salvatore A. Sidoti

(57) ABSTRACT

To provide a liquid accelerator which excels in accelerating effect and which also excels in storage stability at low temperature and inhibitory effect of alkali-aggregation reaction. A liquid accelerator composed of a fluoride-containing aqueous aluminum salt which is obtained through the reaction of aluminum sulfate and hydrofluoric acid, aluminum hydroxide, and one or more kinds of lithium salts selected from the group consisting of lithium hydroxides, lithium carbonates, and lithium sulfates.

19 Claims, 1 Drawing Sheet

U.S. PATENT DOCUMENTS

| | | | |
|---|---|---|---|
| 7,198,669 B2 * | 4/2007 | Angelskaar et al. | 106/823 |
| 2007/0054059 A1 * | 3/2007 | Nakashima et al. | 427/427 |
| 2007/0056473 A1 * | 3/2007 | Nakashima et al. | 106/627 |

FOREIGN PATENT DOCUMENTS

| | | |
|---|---|---|
| EP | 0 508 158 A2 | 10/1992 |
| EP | 0 798 300 | 10/1997 |
| EP | 1 167 317 A | 1/2002 |
| WO | WO 96/05150 | 2/1996 |
| WO | WO 00/78688 A1 | 12/2000 |
| WO | WO 01/42165 A2 | 6/2001 |
| WO | WO 03/029163 A2 | 4/2003 |
| WO | WO 03/045872 A1 | 6/2003 |
| WO | WO 03/106375 A1 | 12/2003 |
| WO | WO 2004/106258 A2 | 12/2004 |
| WO | WO 2006/074739 A1 * | 7/2006 |

OTHER PUBLICATIONS

WO 2005040059 (Maltese et al.) May 6, 2005) abstract only.*
JP 2001261393 (Sep. 26, 2001) Tamaki et al. abstract only.*
Patent Abstracts of Japan, vol. 2000, No. 22, Mar. 9, 2001 & JP 2001 130935 A (Katekkusu:kk; Rescon Mapei AS; Berutekku Industrietechnik GmbH), May 15, 2001 cited in the application. Abstract.
Patent Abstracts of Japan, Vo. 2002, No. 06, Jun. 4, 2002 & JP 2002 047048 A (Denki Kagaku Kogyo KK, Feb. 12, 2002 cited in the application. Abstract.

* cited by examiner

[Figure 1]
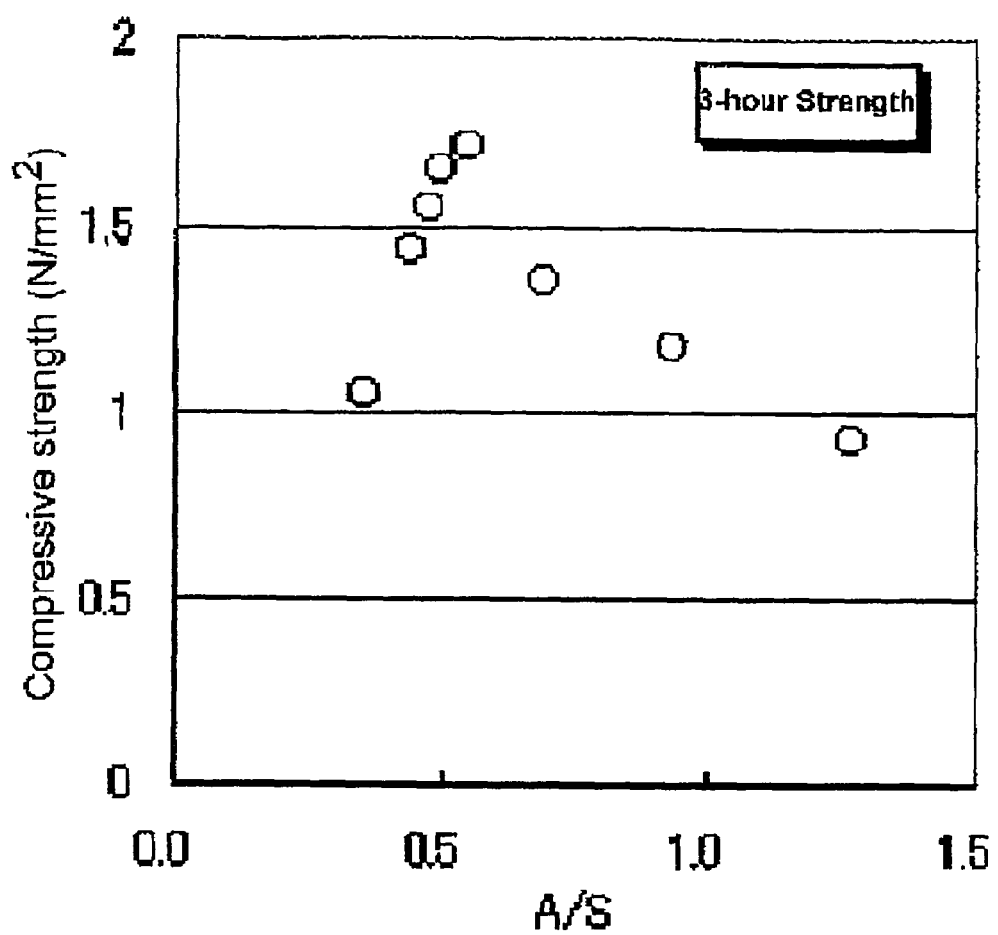

LIQUID ACCELERATOR

CROSS REFERENCE TO RELATED APPLICATIONS

This application is a national stage application of International Application No. PCT/EP2004/009253, filed 18 Aug. 2004, which claims the benefit of Application No. JP 2003-328772, filed 19 Sep. 2003, from which applications priority is claimed.

The present invention relates to a liquid accelerator. Specifically, the present invention relates to a liquid accelerator which excels in accelerating effect and also excels in storage stability at lower temperatures and inhibitory effect of the alkali-aggregate reaction.

BACKGROUND ARTS

Conventionally, to prevent the collapses of exposed terrain surfaces such as a face of slope and a tunnel excavation, there have been used spraying processes which spray an accelerated mortar or concrete on the spray surface, in which process an accelerator is added to cement composition such as mortar or concrete. Generally, as the accelerator, alkali metal salts (sodium and potassium) of aluminate, silicic acid, carbonic acid, etc. have been widely used. Since these compounds have strong alkalinity, they have adverse effects on the environment and the human body in spraying operation; for example, they may attack the skin and cause eye inflammation or corneal corrosion thereby impairing visual acuity.

Moreover, alkaline accelerators, which contains alkali metals such as sodium or potassium, may pose a risk of inducing alkali-aggregate reaction with the aggregates in concrete and, therefore, are not preferable in the viewpoint of durability of the concrete.

Moreover, sprayed concrete generally includes a large quantity of cement per unit area, and therefore a large quantity of alkali (sodium and potassium) is also induced from the cement. Further, since the ratio of fine aggregates is also large, there was a high probability of causing alkali-aggregate reaction. Thus, when a reactive aggregate was used for sprayed concrete, there was a high risk of causing cracks in the concrete after cure thereby impairing the durability. As the countermeasure of this, attempts have been made to use aggregates which would not contribute to alkali-aggregate reaction or to use low alkali type cement; however, it was difficult to fully prevent the problem.

Under these current circumstances, acidic liquid accelerators composed of aluminum sulfate, aluminum hydroxide, and the fluorides of aluminum have been proposed.

For example, a concrete accelerator consisting of aluminum fluoride, acidic or basic solution of aluminum containing aqueous hydrofluoric acid solution of aluminum, lithium silicate, and lithium aluminate has been proposed (see, for example, patent document 1). Moreover, an accelerator which consists of nitrate, sulfate, glycolate, lactate, etc. of aluminum, a compound forming agent, and a corrosion inhibitor and which contains no alkalis and chlorides has been proposed (see, for example, patent document 2).

Furthermore, an accelerator that contains aluminum salts, which contains aqueous fluorides, and sulfates, and that does not contain alkali metals and chlorides has been proposed (see, for example, document 3). Furthermore, a liquid accelerator containing aluminum, sulfur, sodium, and fluorine has been proposed (see, for example, patent document 4). There has been further proposed an accelerator that consists of a fluoride-containing aqueous aluminum salt, which is obtained through the reaction between the aluminum hydroxides or aluminum oxides and hydrofluoric acid, and a sulfate-containing aqueous aluminum salt such as aluminum sulfate and basic aluminum sulfate, and that does not contain alkali metals and chlorides (see, for example, patent document 5).

However, the above described technologies have not provided a liquid accelerator having a sufficient accelerating effect. The present inventors has focused attention on the effects of alkali metals for improving the initial strength development of concrete, and proposed, in Japanese Patent Application No. 2003-62114, a liquid accelerator that contains aluminum sulfate, alkanolamine, alkylene diamine, hydrofluoric acid, and 1 to 8.5% by total alkali of alkali metal salts such as sodium hydroxide, potassium hydroxide, sodium carbonate, potassium carbonate, sodium sulfate, potassium sulfate. However, although this liquid accelerator excelled in accelerating effect and initial strength development, it had a problem in solution stability at low temperatures.

[Patent document 1] Japanese Patent Laid-Open No. 2001-130935.

[Patent document 2] Japanese Patent Laid-Open No. 2001-180994, U.S. Pat. No. 6,514,327

[Patent document 3] Japanese Patent Laid-Open No. 2002-29801.

[Patent document 4] Japanese Patent Laid-Open No. 2002-47048.

[Patent document 5] Japanese Patent Laid-Open No. 2002-80250.

DISCLOSURE OF THE INVENTION

Problem to be Solved by the Invention

Accordingly, it is the object of the present invention to provide a liquid accelerator which excels in accelerating effect, and which also excels in storage stability at low temperatures and in inhibitory effect of alkali-aggregate reaction.

Means for Solving the Problem

The present inventors have eagerly studied to solve the above describe problems eventually finding that all those problems may be solved by using specific lithium salts, and have finally completed the invention.

Thus, the present invention relates to a liquid accelerator composed of a fluoride-containing aqueous aluminum salt, which is obtained through the reaction between aluminum sulfate and hydrofluoric acid, aluminum hydroxide, and one or more kinds of lithium salts selected from the group consisting of lithium hydroxides, lithium carbonates, and lithium sulfates.

The present invention also relates to the above described liquid accelerator in which total alkali content is less than 1%.

Furthermore, the present invention relates to the above described liquid accelerator characterized in that 15 to 35% by mass of aluminum sulfate, 1 to 5% by mass of hydrofluoric acid, less than 15% by mass of aluminum hydroxide, and 3 to 25% by mass of one or more kinds of lithium salts selected from the group consisting of lithium hydroxides, lithium carbonates, and lithium sulfates are used for the total amount of the liquid accelerator.

The present invention further relates to the above described liquid accelerator wherein the ratio A/S of the number of moles of $Al_2O_3$ (A) to the number of moles of $SO_3$ (S) in the liquid accelerator is 0.35 to 1.0.

The present invention further relates to the above described liquid accelerator wherein the source of $SO_3$ is one or more kinds of sulfuric compounds selected from the group consisting of sulfuric acids, aluminum sulfates, lithium sulfates, sodium sulfates, and potassium sulfates.

The present invention further relates to the above described liquid accelerator wherein one or more members selected from the group consisting of $C_1$ to $C_{10}$ organic monocarboxylic and dicarboxylic acids and the metallic salts thereof are contained.

The present invention further relates to the above described liquid accelerator wherein one or more members selected from the group consisting of alkanolamine, alkylene diamine, and triamine are contained.

The present invention further relates to the use of the above described liquid accelerator for sprayed mortar or concrete applied to a dry or wet spraying process.

The present invention further relates to a process of dry or wet spraying wherein the above described liquid accelerator is added to a cement composition such as mortar or concrete in a transport pipe, a watering nozzle, or a spray nozzle either directly to the mixture by means of an accelerator feed device, or to the water content.

The present invention farther relates to a process of dry or wet spraying characterized in that the above described liquid accelerator is added to base mortar or concrete which is added with a high-range AE water-reducing agent and/or a retarder of polycarbonic acid base and which is applied to the spraying process.

ADVANTAGES OF THE INVENTION

The liquid accelerator of the present invention enables to reduce the total alkali of the accelerator by using specific lithium salts and eliminates crystalline precipitation at low temperatures thereby providing excellent storage stability at low temperatures.

By enabling the reduction of the total alkali as describe above, the invention reduces the effect on the environment and human body during spraying operation and the like, and provides the inhibitory effect on the alkali-aggregate reaction.

Since the accelerator of the present invention utilizes a fluoride-containing aqueous aluminum salt containing hydrofluoric acid, the accelerator provides a good spraying work-ability without raising the initial accelerating effect too high, thereby making it possible to prevent the exfoliation of concrete during concrete spraying and enable a thick deposit of concrete.

Moreover, since the above described fluoride-containing aqueous aluminum salt is obtained by adding hydrofluoric acid to aluminum sulfate, the manufacturing of the accelerator poses low risk and safer than conventional ones.

THE BEST MODE FOR CARRYING OUT THE INVENTION

Hereinafter, the present invention will be described in more detail.

The present invention is a liquid accelerator composed of a fluoride-containing aqueous aluminum salt, which is obtained through the reaction between aluminum sulfate and hydrofluoric acid, aluminum hydroxide, and one or more lithium salts selected from the group consisting of lithium hydroxides, lithium carbonates, and lithium sulfates, with the total alkali being less than 1%, and preferably not more than 0.5%. The term "total alkali (%)" in the present invention is expressed by the equation: $Na_2Oeq$=sodium oxide $(Na_2O)$+ 0.658 potassium oxide $(K_2O)$. When the total alkali in the liquid accelerator exceeds 1%, the stability at low temperatures degrades resulting in crystal precipitation, which is not preferable, and also the alkali-aggregate reaction will be negatively affected.

The aluminum sulfate to be used in the present invention may be aluminum sulfate which is generally used as accelerating agent, and it may be either fully or partly hydrated. A typical grade is 17% aluminum sulfate $(Al_2(So_4)_3\text{-}14.3H_2O)$ (the name is after the content of aluminum oxides) and, when using a different grade, a proper quantity may be calculated based on this grade. Also, it is preferably composed that the content of aluminum sulfate is, as the amount of $Al_2(SO_4)_3$, 15 to 35% by mass of the total liquid accelerator.

The hydrofluoric acid to be used in the present invention is generally used as a HF aqueous solution of about 40 to 55% by mass. And the proportion of hydrofluoric acid (as HF) subjected to the reaction with aluminum sulfate is preferably 1 to 5% by mass of the total liquid accelerator.

The present invention utilizes a fluoride-containing aqueous aluminum salt which is obtained by the reaction between aluminum sulfate and hydrofluoric acid; it is preferable that aluminum sulfate of 15 to 35% by mass is reacted with hydrofluoric acid of 1 to 5% by mass, which would provide a good solution stability at low temperatures for a long term.

Since the above described fluoride-containing aqueous aluminum salt is obtained by adding hydrofluoric acid to aluminum sulfate unlike a conventional manner in which aluminum compounds are added to hydrofluoric solution, its manufacturing poses low risk and is safer.

The aluminum hydroxide to be used in the present invention may be amorphous aluminum oxide which is commonly used as accelerating agent, and which is preferably contained up to 15% by mass of the liquid accelerator. It is also possible to use inexpensive crystalline aluminum hydroxides; however, those have a low solubility thereby leading to a decline of solution stability at low temperatures, and therefore can not provide the same level performance as that of the amorphous type.

The lithium salt to be used in the present invention may be any of lithium hydroxide, lithium carbonate, and lithium sulfate, or may be combinations of one or more of them. The preferable proportion of the lithium salt is 3 to 25% by mass of the total liquid accelerator.

The content of the lithium ion in the liquid accelerator is preferably such that the molar ratio Li/Na is not less than 0.6 for the $Na_2O$ equivalent introduced from the mortar or concrete to inhibit alkali-aggregate reaction. Moreover, in the practical use of the liquid accelerator, the content of the lithium ion in the liquid accelerator is preferably in the range of 0.01 to 1.0% by the mass of the cement in the mortar or concrete.

The liquid accelerator of the present invention has a ratio A/S: the number of moles of $Al_2O_3$ (A) to the number of moles of $SO_3$ (S), of 0.35 to 1.0. The range is preferably 0.35 to 0.55, and when A/S is within this range, the liquid accelerator exerts an excellent initial strength development. Moreover, the liquid accelerator of the present invention may utilize sulfuric compounds such as sulfuric acid, aluminum sulfate, lithium sulfate, sodium sulfate, and potassium sulfate as the source of $SO_3$ for controlling A/S. In the case of sodium sulfate and potassium sulfate, they may be used by an amount that total alkali is less than 1%. The preferable proportion of the sulfuric compounds is 5 to 35% by mass of the total liquid accelerator.

The liquid accelerator of the present invention may contain $C_1$ to $C_{10}$ organic mono- and di-carboxylic acids and one or more metal salts thereof for the purpose of improving the initial strength of concrete. The $C_1$ to $C_{10}$ organic mono- and di-carboxylic acids and metal salts thereof may be preferably formic acid, oxalic acid, and glycol acid as well as the metal salts thereof, and other acids such as acetic acid, propionic acid, succinic acid, citric acid and tartaric acid may also be used. Moreover, the proportions of these components are preferably 1 to 10% by mass, and more preferably 4 to 8% by mass of the total liquid accelerator Furthermore, to improve the solution stability, the liquid accelerator of the present invention may be combinations of one or more members of alkanolamine, alkylene diamine, and alkylene triamine. The components of these are preferably ethylenediamine, ethylene-triamine, diethanolamine or triethanolamine, and more preferably diethanolamine. These components are in the proportion of preferably 0.1 to 10% by mass, and more preferably 0.1 to 8% by mass of the total liquid accelerator.

The liquid accelerator of the present invention can be prepared in a simple manner by mixing the above explained components in any order and stirring the mixture, final mixture having a pH of 2 to 8 and containing water of 40 to 70% by mass.

The suitable use of the liquid accelerator of the present invention is to add the liquid accelerator of the present invention into a cement composition such as mortar or concrete applied to conventional dry or wet spraying process. In using it, the liquid accelerator of the present invention may be added by the amount of 5 to 12% by mass with respect to the mass of the cement in the cement composition, although this will vary depending on the applications.

The present invention is a process of dry or wet spraying wherein the above described liquid accelerator is added to a cement composition such as mortar or concrete in a transfer pipe, watering nozzle, or a spraying nozzle either directly to the mixture by means of an accelerator feed device, or to the water content.

Moreover, the present invention is a process of spraying wherein the liquid accelerator is added by a method shown in [0027] to a base mortar or concrete which is added with high-range AE water-reducing agent and/or a retarder of polycarboxylic acid base and which is applied to the spraying process.

The high-range AE water-reducing agent of polycarboxylic acid base of the present invention may be any commercially available one for general purpose uses. Commercially available high-range AE water-reducing agents of polycarboxylic acid base includes: polycarboxylic acid base cement water-reducing agent having polyalkeyleneoxide group such as JP,A,58-38380 (copolymer of polyethylene glycol methacrylate and methacrylic acid), JP,A,62-70250 (copolymer of polyethylene glycol methacrylate, methacrylic acid, and amide compound adduct having polyalkeyleneoxide of unsaturated carboxylic acid); and ones containing WP,A,05-213644 (copolymer of polyethylene glycol methacrylate and methacrylic acid), JP,A,05-238795 (copolymer selected from polyalkylene glycol diester base monomers having unsaturated bonds, acrylic acid base monomers and polyalkylene glycol monoester monomers having unsaturated bond) JP,A, 09-286645 (copolymer of polyethylene glycol methacrylate, of which oxyethylene group has different chain lengths of 1 to 10 and 11 to 100, and methacrylic acid), Japanese Patent No. 2541218 (copolymer of polyoxyalkeylene derivatives and maleic anhydride) JP,A,07-215746 (copolymer of polyoxyalkeylene derivatives and maleic anhydride), JP,A,05-310458 (copolymer of alkenyl ether and maleic anhydride), JP,A, 0474748 (copolymer of olefins of carbon number 2 to 8 and ethylene-base unsaturated dicarboxylic anhydride), JP,A,62-83344 (metallic complex with polyacrylic acid or copolymers of olefins of carbon number 2 to 8 and ethylene-base unsaturated dicarboxylic acid etc.), JP,A,2001-180998 (concrete admixture which contains copolymer mixture which is obtained by copolymerizing a specific monomer (A) such as ethylene-base unsaturated carboxylic derivatives having polyoxyalkylene group, and another specific monomer (B) such as (metha) acrylic acid, and in which the molar ratio (A)/(B) is changed at least once during the reaction), JP,B, 06-99169 (polyethylene-imine compound consisting of poly (acidic group substituted alkyl group and/or acidic group substituted acyl group)polyethylene-imine and poly(acidic group substituted alkyl group and carbamoyl alkyl group) polyethylene-imine), JP,A,08-283350 (oxyalkyleneglycol-alkenyl ether and unsaturated dicarboxylic acid derivatives and vinyl-base polyalkyleneglycol compounds, polysiloxane compounds or ester compounds), JP,A,2000-351820 (copolymer based on unsaturated monocarboxylic derivatives or dicarboxylic derivatives and oxyalkylneneglycol-alkenyl ether group).

The retarder in the present invention may be exemplified by phosphonic acid derivatives selected from the group consisting of aminotri(methylenephosphonic acid), amino-tri(methylenephosphonic acid) 5 sodium salt, 1-hydroxyethylydene-1,1-diphosphonic acid, 1-hydroxyethylydene-1,1-diphosphonic acid 4 sodium salt, ethylenediaminetetra (methylenephosphonic acid), ethylenediaminetetra (methylenephosphonic acid) calcium/sodium salt, hexamethylene-diaminetetra(methylenephosphonic acid), hexamethylene-diaminetetra(methylenephosphonic acid) potassium salt, diethylenetriaminepenta(methylenephosphonic acid), and diethylenetriaminepenta(methylenephosphonic acid) sodium salt; and hydroxycarbonic acid and the salts thereof selected from salicylic acid, citric acid, lactic acid, gluconic acid, tartaric acid, muconic-acid, and glucoheptanoic acid. Preferable retarder may be exemplified by ones containing phosphonic acid derivatives and citric acid and/or gluconic acid, and the salts thereof.

EXAMPLES

Hereinafter, the present invention will be explained in detail referring to experimental examples 1 to 4. The materials, and the composition and measurement method of the mortar used for the experiments are shown below.

1. Materials Used and Mortar Composition

Cement: Ordinary portland cement manufactured by TAIHEIYO CEMENT Co.

total alkali: 0.58%

Fine aggregate: OI River System pit sand

Reactive aggregate

High-range AE water-reducing agent: Nt-1000 (Manufactured by NMB Co., Ltd.)

Retarder: DELVOCRETE (Manufactured by NMB Co., Ltd.)

Conventional sample 1: See Table 2, 10% by weight for the cement mass

Conventional sample 2: Potassium aluminate, 10% by weight for the cement mass.

Invention samples 1 to 9: 10% by weight for the cement mass.

Mortar composition: water/cement ratio (W/C)=40%, sand/cement ratio (S/C)=2.1

Measurement method

Starting time: Time needed for the Proctor penetration resistance value to reach 3.5 N/mm²
Compressive strength: In accordance with JIS R 5201
Change rate of length: In accordance with JIS A 1804

Experimental Example 1

The results of the mortar test are shown in Table 1 and FIG. 1 for the cases in which the A/S ratio of the liquid accelerator is varied from 0.35 to 1.27. As seen in Table 1 and FIG. 1, when the A/S of the liquid accelerator is within the range of 0.35 to 1.27, a sufficient initial strength was developed at the ages of 3 and 24 hours.

TABLE 1

| Accelerator type | A/S | $Al_2O_3$ | $SO_4^{2-}$ | Compressive strength (N/mm²) | |
|---|---|---|---|---|---|
| | | | | 3 hours | 24 hours |
| Invention sample 1 | 0.35 | 8.50 | 22.9 | 1.05 | 15.4 |
| Invention sample 2 | 0.44 | 9.03 | 19.5 | 1.43 | 15.8 |
| Invention sample 3 | 0.48 | 9.25 | 18.3 | 1.55 | 13.8 |
| Invention sample 4 | 0.50 | 9.4 | 17.8 | 1.65 | 13.5 |
| Invention sample 5 | 0.54 | 9.6 | 16.8 | 1.71 | 13.0 |
| Invention sample 6 | 0.69 | 10.3 | 14.1 | 1.35 | 8.94 |
| Invention sample 7 | 0.93 | 11.8 | 12.0 | 1.18 | 6.25 |
| Invention sample 8 | 1.27 | 12.8 | 9.58 | 0.93 | 5.78 |

Experimental Example 2

The solution stability at low temperatures were compared using the conventional sample 1 and the invention sample 9 shown in Table 2. Table 3 shows the result of the tests in which the liquid accelerators were stored at temperatures of −5, 5, 10, 20, 30, 40 degrees C. for three months. The invention sample 9 showed a good solution stability without crystal precipitation even at low temperatures for a long period.

TABLE 2

| Component | Component sample 1 (% by mass) | Invention sample 9 (% by weight) |
|---|---|---|
| $Al_2(SO_4)_3$ | 18 | 25 |
| $Al(OH)_3$ | 5 | 2 |
| HF | 2 | 2 |
| $(COOH)_2$ | 5 | 5 |
| DEA | 2 | 2 |
| $Na_2SO_4$ | 10 | — |
| $Li_2CO_3$ | — | 5 |

TABLE 3

| Accelerator type | Ambient temperature | | | | | |
|---|---|---|---|---|---|---|
| | −5° C. | 5° C. | 10° C. | 20° C. | 30° C. | 40° C. |
| Conventional sample 1 | x | x | ○ | ○ | ○ | ○ |
| Invention sample | ○ | ○ | ○ | ○ | ○ | ○ |

Evaluation method: 'circle' indicates 'good', 'x' indicates 'crystal precipitation'

Experimental Example 3

Using the conventional sample 1 and the invention sample 9 shown in Table 2, the starting time and the development of the compressive strength were compared by the mortar test. As seen from the mortar test results shown in Table 4, the invention sample 9 showed an earlier starting time than the conventional sample 1 and also showed a good initial strength development characteristics. Further, when the invention sample 9 and the retarder were used together, the starting time was earlier and also the initial strength development was good.

TABLE 4

| Accelerator type | Starting time (minute-second) | Compressive strength (N/mm²) | | | |
|---|---|---|---|---|---|
| | | 6 hours | 24 hours | 7 days | 28 days |
| Conventional sample 1 | 9-00 | 4.68 | 18.8 | 52.5 | 63.1 |
| Invention sample 9 | 4-00 | 4.62 | 18.5 | 52.4 | 64.1 |
| Invention sample 9 + retarder | 3-00 | 4.88 | 19.2 | 53.3 | 63.8 |

Experimental Example 4

Using the conventional sample 2 shown in Table 2, a test was conducted in accordance with JIS A1804 Concrete Production Process Management Test Method: "Alkali-silica reactivity test of aggregate (Rapid determination)." The solution was adjusted by using NaOH aqueous solution so that total $Na_2O$ equivalent quantity contained in the mortar is 0.8%, 1.0%. As shown in Table 5, the invention sample 9 showed an inhibitory effect on the alkali-aggregate reaction.

TABLE 5

| Accelerator type | Change rate of length | |
|---|---|---|
| | Equivalent $Na_2O$ from cement = 0.8% | Equivalent $Na_2O$ from cement = 1.0% |
| Conventional sample 2 | 0.25 | 0.36 |
| Invention sample 9 | 0.03 | 0.05 |

Experimental Example 5

Using the concrete composition shown in Table 6, and the accelerators shown in Table 7, a thick deposit capability test of sprayed concrete was conducted. Concrete spraying was conducted on the top end of a tunnel until an exfoliation occurred and the average thickness of the sprayed concrete was measured. As shown in Table 7, by adding HF there was observed an effect of increasing the deposit thickness of sprayed concrete.

TABLE 6

| | | Unit quantity (kg/m³) | | | |
|---|---|---|---|---|---|
| W/C | s/a | W | C | S | G |
| 42.2 | 60 | 190 | 450 | 991 | 678 |

TABLE 7

| Accelerator type | Mass of HF (%) | Top end (thick deposit capability) Average sprayed thickness (cm) |
|---|---|---|
| Accelerator 1 | 0 | 23 |
| Accelerator 2 | 2 | 35 |
| Accelerator 3 | 4 | 37 |

INDUSTRIAL APPLICABILITY

According to the present invention, there is provided a liquid accelerator which excels in accelerating effect and which also excels in the storage stability at low temperatures and the inhibitory effect of the alkali-aggregate reaction.

BRIEF DESCRIPTION OF THE DRAWING

FIG. 1 shows the results of initial strength for the cases in which the A/S ratio is varied.

The invention claimed is:

1. A liquid accelerator comprising a fluoride-containing aqueous aluminum salt, wherein the fluoride-containing aqueous aluminum salt is the product of a reaction of aluminum sulfate and hydrofluoric acid, aluminum hydroxide, and one or more kinds of lithium salts, wherein the one or more kinds of lithium salts are at least one of lithium hydroxide, lithium carbonate, or lithium sulfate, and wherein the ratio A/S of the number of moles of $Al_2O_3$ (A) to the number of moles of $SO_3$ (S) in the liquid accelerator is 0.35 to 0.55.

2. The liquid accelerator according to claim 1, wherein total alkali content of the liquid accelerator is less than 1% by mass of the liquid accelerator.

3. The liquid accelerator according to claim 1, wherein 15 to 35% by mass of aluminum sulfate, 1 to 5% by mass of hydrofluoric acid, less than 15% by mass of aluminum hydroxide, and 3 to 25% by mass of one or more kinds of lithium salts are used for the liquid accelerator.

4. The liquid accelerator according to claim 1, further comprising $SO_3$ wherein the source of $SO_3$ is one or more kinds of sulfuric compounds comprising at least one of sulfuric acids, aluminum sulfates, lithium sulfates, sodium sulfates, or potassium sulfates.

5. The liquid accelerator according to claim 1, further comprising one or more members comprising at least one of $C_1$ to $C_{10}$ organic monocarboxylic or dicarboxylic acids or the metallic salts thereof.

6. The liquid accelerator according to claim 1, further comprising at least one of alkanolamine, alkylene diamine, or triamine.

7. A method comprising:
using the liquid accelerator according to claim 1 for sprayed mortar or concrete applied to a dry or wet spraying process.

8. A method of dry or wet spraying comprising:
adding the liquid accelerator according to claim 1 to a cement composition in a transport pipe, a watering nozzle, or a spray nozzle, wherein the liquid accelerator is added either directly to the composition by means of an accelerator feed device, or to the water content.

9. A method of dry or wet spraying comprising:
adding the liquid accelerator according to claim 1 to base mortar or concrete which is added with a high-range AE water-reducing agent, retarder of polycarbonic acid base, or a combination thereof.

10. A liquid accelerator comprising: a fluoride-containing aqueous aluminum salt, wherein the fluoride-containing aqueous aluminum salt is the product of a reaction of aluminum sulfate and hydrofluoric acid, aluminum hydroxide, and one or more kinds of lithium salts, wherein the one or more kinds of lithium salts are at least one of lithium hydroxides, lithium carbonates or lithium sulfates, and
wherein the ratio A/S of the number of moles of $Al_2O_3$ (A) to the number of moles of $SO_3$ (S) in the liquid accelerator is 0.35 to 0.55.

11. The liquid accelerator according to claim 10, wherein total alkali content of the liquid accelerator is less than 1% by mass of the liquid accelerator.

12. The liquid accelerator according to claim 10, wherein 15 to 35% by mass of aluminum sulfate, 1 to 5% by mass of hydrofluoric acid, less than 15% by mass of aluminum hydroxide, and 3 to 25% by mass of one or more kinds of lithium salts, wherein the lithium salts are at least one of lithium hydroxides, lithium carbonates, or lithium sulfates, are used for the liquid accelerator.

13. The liquid accelerator according to claim 10, further comprising $SO_3$, wherein the source of $SO_3$ is one or more kinds of sulfuric compounds that are at least one of sulfuric acids, aluminum sulfates, lithium sulfates, sodium sulfates, or potassium sulfates.

14. The liquid accelerator according to claim 10, further comprising one or more members that are at least one of $C_1$ to $C_{10}$ organic monocarboxylic or dicarboxylic acids or the metallic salts thereof.

15. The liquid accelerator according to claim 10, further comprising one or more members that are at least one of alkanolamine, alkylene diamine, or alkylene triamine.

16. A method comprising:
using the liquid accelerator according to claim 10 for sprayed mortar or concrete applied to a dry or wet spraying process.

17. A method of dry or wet spraying comprising:
adding the liquid accelerator according to claim 10 to a cement composition in a transport pipe, a watering nozzle, or a spray nozzle, wherein the liquid accelerator is added either directly to the composition by means of an accelerator feed device, or to the water content.

18. A method of dry or wet spraying comprising:
adding the liquid accelerator according to claim 10 to a base mortar or concrete which is added with a high-range AE water-reducing agent, a retarder of polycarbonic acid base, or a combination thereof.

19. A liquid accelerator comprising a fluoride-containing aqueous aluminum salt, wherein the fluoride-containing aqueous aluminum salt is the product of a reaction of aluminum sulfate and hydrofluoric acid, aluminum hydroxide, and one or more kinds of lithium salts, wherein the one or more kinds of lithium salts provide a content of lithium ions in the liquid accelerator in the range of 0.01 to 1.0% by mass of cement in a mortar or concrete composition into which the liquid accelerator is to be added, and wherein the ratio A/S of the number of moles of $Al_2O_3$ (A) to the number of moles of $SO_3$ (S) in the liquid accelerator is 0.35 to 0.55.

* * * * *

UNITED STATES PATENT AND TRADEMARK OFFICE
CERTIFICATE OF CORRECTION

PATENT NO. : 7,662,230 B2
APPLICATION NO. : 10/571728
DATED : February 16, 2010
INVENTOR(S) : Angelskaar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 770 days.

Signed and Sealed this

Thirtieth Day of November, 2010

David J. Kappos
*Director of the United States Patent and Trademark Office*